United States Patent [19]

Tuovinen

[11] Patent Number: 4,818,290

[45] Date of Patent: Apr. 4, 1989

[54] METHOD FOR UTILIZING SLAG FROM FERROALLOY PRODUCTION

[75] Inventor: Frans H. Tuovinen, Ulvila, Finland

[73] Assignee: Outokumpu Oy, Helsinki, Finland

[21] Appl. No.: 88,506

[22] Filed: Aug. 19, 1987

Related U.S. Application Data

[63] Continuation of Ser. No. 804,375, Dec. 3, 1985, abandoned.

[30] Foreign Application Priority Data

Dec. 21, 1985 [FI] Finland ................... 845115

[51] Int. Cl.$^4$ .............. C03C 13/06; C04B 5/06; C04B 14/46
[52] U.S. Cl. ..................... 106/117; 501/28; 501/36; 501/95; 501/155
[58] Field of Search ............ 501/28, 36, 95, 155; 106/117

[56] References Cited

U.S. PATENT DOCUMENTS

| | | | |
|---|---|---|---|
| 130,578 | 8/1872 | Hartman | 501/28 |
| 429,225 | 6/1890 | Bryan | 501/28 |
| 2,873,197 | 2/1959 | McMullen | 501/35 |
| 3,081,179 | 3/1963 | Charcet et al. | 501/35 |
| 3,183,104 | 5/1965 | Thomas | 501/35 |
| 3,449,137 | 6/1969 | Ekdahl | 501/35 |
| 4,047,968 | 9/1977 | zur Strassen et al. | 106/117 |
| 4,165,991 | 8/1979 | zur Strassen et al. | 106/117 |
| 4,174,961 | 11/1979 | Wolfs et al. | 100/112 |
| 4,363,878 | 12/1982 | Yamamoto et al. | 501/95 |
| 4,511,664 | 4/1985 | Yamamoto | 501/35 |

FOREIGN PATENT DOCUMENTS

| | | | |
|---|---|---|---|
| 686785 | 5/1964 | Canada | 501/35 |
| 14160 | 8/1980 | European Pat. Off. | 501/35 |
| 2546530 | 11/1984 | France | 106/117 |
| 12091 | 4/1973 | Japan | 501/95 |
| 51-107310 | 9/1976 | Japan | 501/35 |
| 96546 | 5/1985 | Japan | 501/36 |
| 458522 | 1/1975 | U.S.S.R. | 501/35 |
| 11184 | 6/1910 | United Kingdom | 106/117 |
| 765244 | 1/1957 | United Kingdom | 501/35 |
| 2077251 | 12/1981 | United Kingdom | 106/117 |

*Primary Examiner*—William R. Dixon, Jr.
*Assistant Examiner*—Ann M. Knab
*Attorney, Agent, or Firm*—Brooks Haidt Haffner & Delahunty

[57] ABSTRACT

The invention relates to a method for utilizing slag from ferroalloy production in manufacturing heat-resistant, fire-resistant and/or alkali-resistant fiber materials, when the original slag is based on aluminum oxide and silicon oxide. According to the invention, aluminum oxide and/or silicon oxide is added into the molten slag in order to change the slag viscosity and to adjust the defibration temperature of the slag.

6 Claims, 1 Drawing Sheet

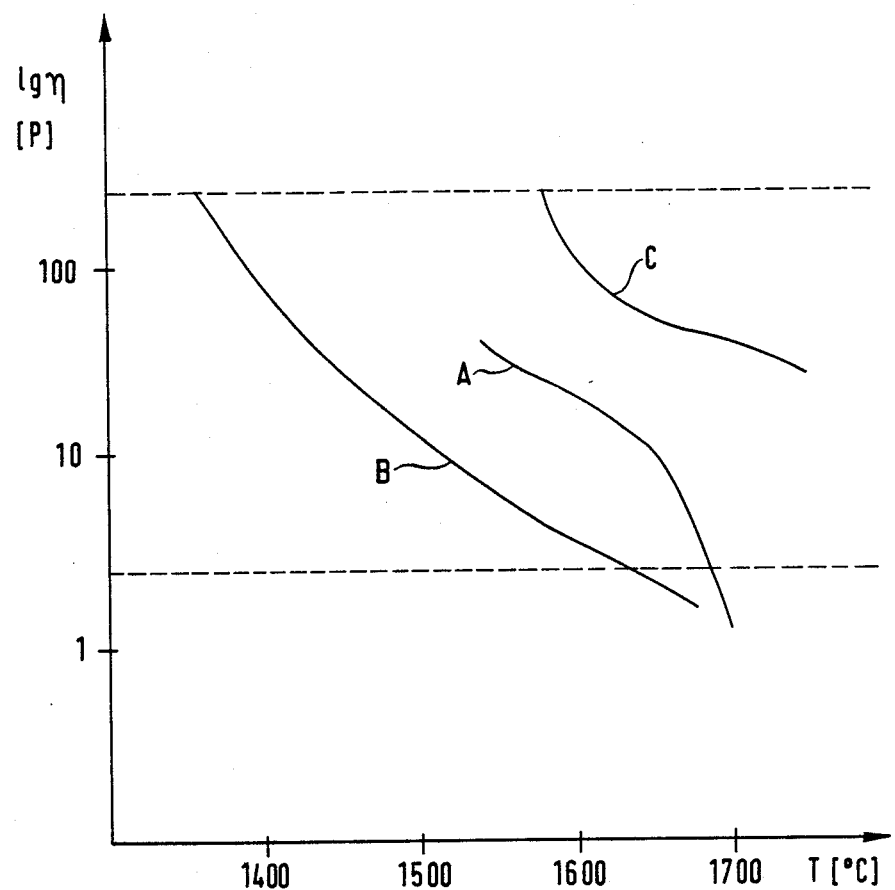
VISCOSITIES OF MATERIALS AS A
FUNCTION OF TEMPERATURE

METHOD FOR UTILIZING SLAG FROM FERROALLOY PRODUCTION

This application is a continuation of application Ser. No. 804,375, filed Dec. 3, 1985 aband.

The present invention relates to a method for utilizing slag from ferroalloy production, particularly the slag from ferrochromium production, in order to manufacture heat-resistant, fire-resistant and/or alkali-resistant fibre materials.

Mineral wools are manufactured of molten silicates by means of a quick cooling process, so that a glass-like structure is achieved. Apart from silicates, mineral wools contain for example calcium oxide, aluminium oxide and magnesium oxide.

Among the quality requirements set for mineral fibres—in addition to the requirements of the manufacturing process itself—are qualities connected to the practical used of mineral wool, for instance the length and diameter of the fibres, the thermal conductivity, fire resistance capacity, homogeneity and glass-like nature of the material, as well as its specific weight, chemical resistance and strength.

The glass-like nature of mineral wool is an important factor with respect to the final product. The formation of glass is enchanced for instance by only a small difference in energy between the crystalline and molten states, a high energy of activation in the crystallization, i.e. high viscosity of the molten substance, and quick cooling. In addition to this, the formation of glass is affected by the acid-base ratio of the molten substance, so that the glass will be the more instabile, the higher its basicity. The viscosity of a silicate solution is mainly determined by the size of the anions contained therein. As a general principle it can be said that the larger the proportion of complex agents contained in the molten substance, the higher its viscosity. Agents increasing viscosity are for example silicon oxide, aluminium oxide, titanium oxide and chromium(III)oxide. Among alkaline oxides, iron oxide and manganese oxide are better flux agents than magnesium oxide. Furthermore, slags with a high magnesium content are less viscous than slags containing calcium.

In the production of mineral wool, surface tension also plays an important role in successful defibration, because it is necessary that the molten substance has a free access out of the furnace and the defibration machine. A practical guideline for the ratio between the viscosity and surface tension is defined to be over 0.01, or else the molten flow will start to make droplets. As a surface-active substance, $SiO_2$ tends to form a viscous, acidic film on the slag surface, in which film the viscosity is much higher than within the slag. In addition to this, other surface-active substances, such as sulphidic sulphur, can reduce the surface tension, which is still dependent on the acidity of the molten substance.

Slags from ferroalloy production, such as ferrochromium and ferromanganese slags, are generally based on aluminium oxide and silicon oxide. They have been utilized for several practical purposes, for example as abrasive sand and cement aggregate, as well as an aggregate in fire-resistant bricks. While used for these purposes, none of the main components of the ferrochromium slag have been added into the slag; for example, while used as an aggregate in brick production, only binding agents have been added into the ferrochromium slag in order to produce a brick of a desired shape. In that case the viscosity of the ferrochromium slag has not caused any difficulties, because the required temperatures for processing the desired product have been very low, mainly under 100° C.

The object of the present invention is to realize a method for utilizing the slag from ferroalloy production so that while in molten state, it receives an addition of its main components in order to change its composition so that it is suited for the production of heat-resistant, fire-resistant and/or alkali-resistant fibre materials. The essential novel features of the invention are apparent from the appended patent claims.

According to the invention, into the molten slag received from ferroalloy production and based on aluminium oxide and silicon oxide, containing 20–40% by weight silicoon oxide, 20–36% by weight aluminium oxide, 0–12% by weight calcium oxide and 15–36% by weight magnesium oxide, is added aluminium oxide, $Al2O3$ and/or silicon oxide, $SiO2$, so that resulting product is, when the phase equilibriums are taken into account, advantageously either mineral wool raw material with a melting temperature lower than the slag melting temperature, or ceramic fibre raw material with a melting temperature higher than the slag melting temperature.

While manufacturing raw material for mineral wool according to the method of the present invention, the manufacturing process is advantageous with respect to the heat economy, because the caloric capacity of the slag itself can be utilized in the alloying process, and there is no essential need for additional heat. The resulting final product, i.e. mineral wool with slag as the basis material, can advantageously be used instead of asbestos, because this kind of mineral wool does not cause health damages like asbestos.

While utilizing ferroalloy slags, such as slags from ferrochromium or ferromanganese production, for manufacturing ceramic fibres with a high melting point according to the invention, it is necessary to bring additional heat into the process. However, by profitably feeding the compound agents, the slag viscosity can be adjusted so that the most advantageous defibration temperature is achieved for the process, and thus the amount of required additional heat can also be adjusted to the minimum.

In a preferred application of the method of the invention, the ratio between the aluminium oxide and silicon oxide contained in the slag is adjusted so that in order to produce mineral wool with a low melting temperature, a composition essentially corresponding to the cordierite area of a multi-phase equilibrium is formed in the material. Respectively, while producing material with a high melting temperature, the ratio between the aluminium oxide and silicon oxide contents is changed by means of additions so that a composition essentially corresponding to the corundum area of a multi-phase equilibrium is achieved in the material.

According to the invention, a profitable mineral wool composition is achieved by adding into the slag 10–45% by weight, preferably 20–30% by weight aluminium oxide with respect to the slag weight, when a high temperature resistance is required in the final product, and silicon oxide and aluminium oxide in the ratio (2.5–5):1, when a lower temperature resistance is required in the final product.

Owing to the variations in the contents of the slags used in an advantageous application of the method of the present invention, it may also be necessary to add small amounts of other oxidic components into the material compound in order to achieve ideal properties for the final product. Such possible components are calcium oxide, iron oxide, zirconium oxide, zinc oxide, titanium oxide and chromium oxide. Generally their proportion remains, however, very small.

The invention is explained below in more detail with reference to the appended examples and the enclosed drawing, which drawing is a diagram illustrating the temperature dependence of the viscosities of the alloyed mineral wool raw materials used in the examples, with respect to non-alloyed ferroalloy slag.

According to the drawing, the curve A stand for the temperature dependence of the viscosity of non-alloyed slag from ferroalloy production. It is apparent from the diagram that the temperature dependence of curve A is very strong, and therefore its defibration at a determined temperature is extremely difficult. The diagram also shows the advantageous viscosity range suited for defibration, which is 2.5–250 poises. By means of alloying such ferroalloy slags that are suited to be employed in the method of the present invention, an essential change towards advantageous defibration was achieved in the viscosity-temperature dependence of the alloyed raw material for mineral wool. This can be clearly seen in the viscosity-temperature dependence of the alloyed raw material compounds of the examples, which curves are illustrated in the appended drawing and show that their temperature dependence is essentially weaker than with non-alloyed ferroalloy slag. As for the examples, they also represent a preferred embodiment of the invention.

EXAMPLE 1

Slag received from ferrochromium production and containing 25.5% by weight magnesium oxide, 5.7% by weight calcium oxide, 27.9% by weight aluminium oxide and 33% by weight silicon oxide, was conducted from the ferrochromium process into the holding furnace of the slag wool treatment. While transporting the slag from the holding furnace into the defibration furnace, into the slag was added cyanite-based material containing silicon oxide and aluminium oxide in the ratio 4:1, so that the resulting slag wool raw material contained 18.4% by weight magnesium oxide, 4.1% by weight calcium oxide, 25.0% by weight aluminium oxide and 46.8% by weight silicon oxide, and its composition corresponded to the cordierite area of the phase equilibrium system with respect to the ratio between silicon oxide and aluminium oxide. The received raw material was defibrated in the ideal defibration temperature 1500° C., which was determined by aid of the temperature-viscosity curve (in the drawing curve B) formed on the basis of measurements for the raw material compound created according to the method of the invention, and the resulting product after defibration was slag wool. In the defibration process, it was possible to utilize the excessive heat created already in the melting of the slag, and the introduction of additional external heat in order to maintain the defibration temperature was unnecessary.

EXAMPLE 2

The profitability of the slag according to example 1 in the production of ceramic fibres with a high melting temperature was investigated by producing a molten compound of ferrochromium slag and aluminium oxide, which compound contained 70% by weight slag and 30% by weight aluminium oxide. The resulting compound contained 17.9% by weight magnesium oxide, 4.0% by weight calcium oxide, 39.5% by weight aluminium oxide and 23.1% by weight silicon oxide. The compound, which corresponded to the corundum area of the phase equilibrium oxide, was further defibrated according to example 1 in the temperature 1700° C. by aid of the curve C of the drawing. The resulting final product was fibre material with a temperature resistance of about 1300° C.

I claim:

1. A method of using a molten slag from ferroalloy production containing 20–30 percent by weight silicon oxide, 20–36 percent by weight aluminum oxide and 15–36 percent by weight magnesium oxide for the manufacture of heat-resistant, fire-resistant and/or alkali-resistant fibre material which comprises adding 10–45 percent by weight aluminum oxide or silicon oxide and aluminum oxide into the molten slag in order to change the slag viscosity and to adjust the defibration temperature of the slag and then defibrating the product.

2. The method according to claim 1 comprising adding 20–30 percent by weight aluminum oxide.

3. The method according to claim 1 comprising adding to the slag silicon oxide and aluminum oxide in a ratio between 2.5 to 1 and 5.0 to 1.

4. A method of using molten slag from ferroalloy production to produce a mineral wool raw material having a melting temperature lower than the melting temperature of the slag, comprising: starting with molten slag containing, by weight percent, 20–30% silicon oxide, 20–36% aluminum oxide, 0–12% calcium oxide and 15–36% magnesium oxide; adding to said molten slag silicon oxide and aluminum oxide in the ratio of 2.5 to 5 parts silicon oxide to 1 part aluminum oxide; and defibrating the product of said addition without adding heat from any external source, but using the heat content of the slag to maintain a proper defibration temperature.

5. A method of using molten slag resulting from ferroalloy production for the manufacture of ceramic fibre material having a melting temperature higher than the melting temperature of the slag, comprising: starting with molten slag containing, by weight percent, 20–30% silicon oxide, 20–36% aluminum oxide, 0–12% calcium oxide and 15–36% magnesium oxide; adding into the slag an amount aluminum oxide equal to 10–45% of the weight of the molten slag; and defibrating the product of the addition.

6. The method of claim 5 where the amount of aluminum oxide added is 20–30% of the weight of the molten slag.

* * * * *

UNITED STATES PATENT AND TRADEMARK OFFICE
CERTIFICATE OF CORRECTION

PATENT NO. : 4,818,290
DATED : April 4, 1989
INVENTOR(S) : Frans H. Tuovinen

It is certified that error appears in the above-identified patent and that said Letters Patent is hereby corrected as shown below:

Column 2:

line 16, "weight silicoon" should read --weight silicon--.

line 19, "Al203" should read --$Al_2O_3$--; and

"SiO2" should read --$SiO_2$--.

Column 3:

line 49, "oxide and 46.8%" should read --oxide and 46.2%--.

Signed and Sealed this

Seventeenth Day of October, 1989

Attest:

DONALD J. QUIGG

Attesting Officer      Commissioner of Patents and Trademarks